(12) United States Patent
Hassan et al.

(10) Patent No.: US 12,204,394 B2
(45) Date of Patent: Jan. 21, 2025

(54) PRECISE POWER CYCLE MANAGEMENT IN DATA STORAGE DEVICES

(71) Applicant: Western Digital Technologies, Inc., San Jose, CA (US)

(72) Inventors: Yoseph Hassan, Nechusha (IL); Dmitry Vaysman, Milpitas, CA (US); Julian Vlaiko, Kfar Saba (IL); Shay Benisty, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 159 days.

(21) Appl. No.: 17/682,060

(22) Filed: Feb. 28, 2022

(65) Prior Publication Data

US 2022/0413583 A1  Dec. 29, 2022

Related U.S. Application Data

(60) Provisional application No. 63/215,969, filed on Jun. 28, 2021.

(51) Int. Cl.
*G06F 1/32* (2019.01)
*G06F 1/3225* (2019.01)
*G06F 3/06* (2006.01)

(52) U.S. Cl.
CPC .......... *G06F 1/3225* (2013.01); *G06F 3/0625* (2013.01); *G06F 3/0634* (2013.01); *G06F 3/0679* (2013.01)

(58) Field of Classification Search
CPC .... G06F 1/3225; G06F 3/0625; G06F 3/0634; G06F 3/0679
See application file for complete search history.

(56) References Cited

U.S. PATENT DOCUMENTS

| | | | |
|---|---|---|---|
| 8,627,124 B2 | 1/2014 | Carter et al. | |
| 8,856,566 B1* | 10/2014 | Jane | G06F 1/3203 713/320 |
| 9,541,988 B2 | 1/2017 | Khatib et al. | |
| 9,965,206 B2 | 5/2018 | Bass, Jr. et al. | |
| 10,146,293 B2 | 12/2018 | Khatib et al. | |
| 10,838,633 B2 | 11/2020 | Hayes et al. | |
| 2011/0029787 A1* | 2/2011 | Day | G06F 1/266 713/300 |
| 2012/0185706 A1* | 7/2012 | Sistla | G06F 1/3206 713/300 |

(Continued)

*Primary Examiner* — Jaweed A Abbaszadeh
*Assistant Examiner* — Cheri L Harrington
(74) *Attorney, Agent, or Firm* — LOZA & LOZA, LLP; Gabriel Fitch

(57) ABSTRACT

Methods and apparatus for precise power cycle management in data storage devices are provided. One such apparatus is a data storage device that includes a non-volatile memory (NVM) and a processor coupled to the NVM. In such case, the processor is configured to determine a first peak power for a first power phase, operate the DSD at a first DSD power consumption that is less than the first peak power for the first power phase, determine a second peak power for a second power phase based on a residual power equal to a difference between a preselected average power threshold and the first DSD power consumption, and operate the DSD at a second DSD power consumption that is less than the second peak power for the second power phase.

21 Claims, 11 Drawing Sheets

(56) References Cited

U.S. PATENT DOCUMENTS

| | | | |
|---|---|---|---|
| 2013/0138985 A1* | 5/2013 | Wang | G06F 1/3206 |
| | | | 713/320 |
| 2013/0226362 A1* | 8/2013 | Jagadishprasad | G06F 1/3203 |
| | | | 700/297 |
| 2015/0055243 A1* | 2/2015 | Ehrlich | G11B 19/2072 |
| | | | 360/69 |
| 2016/0116968 A1* | 4/2016 | Thangaraj | G06F 1/3268 |
| | | | 713/320 |
| 2018/0246551 A1* | 8/2018 | Wiesbauer | G06F 1/3203 |
| 2019/0065086 A1* | 2/2019 | Margetts | G06F 3/0688 |
| 2021/0026430 A1* | 1/2021 | Nakamura | G06F 1/28 |
| 2021/0181830 A1* | 6/2021 | Lee | G06F 1/3296 |
| 2021/0349512 A1* | 11/2021 | Guim Bernat | H04L 12/10 |
| 2022/0019274 A1* | 1/2022 | Yraceburu | G06F 1/3206 |

* cited by examiner

Definitions — 402

$P_{MA}$: Maximum Allowed Power, Maximum allowed power per algorithm window.
$P_{GA}$: Guaranteed Average Power, Average power contracted with Host on a time window (Host window > 2*algorithm window).
$P_{TA}[n]$ : Temporal Average Power, Average power used in algorithm window n (measured or calculated).
$P_{MT}[n]$: Temporal Maximum Power, Maximum power allowed for algorithm window n.
Credit[n]: Power credit left for window n from previous windows. May be positive or negative.

Credit and Max Temporal Power Equations — 404

$Credit[0] = 0$
$Credit[n+1] = Credit[n] + (P_{GA} - P_{TA}[n])$ $$P_{MT}[n] = \begin{cases} P_{MA} & , \{n=0, n=Even\} \\ (P_{GA} + Credit[n]) & , \{n=Odd\} \end{cases}$$

*FIG. 4*

Definitions

602

$P_{MA}$: Maximum Allowed Power, Maximum allowed power per algorithm window.
$P_{GA}$: Guaranteed Average Power, Average power contracted with Host on a time window (Host window > 2*algorithm window).
$P_{TA}[n]$ : Temporal Average Power, Average power used in algorithm window n (measured or calculated).
$P_{MT}[n]$: Temporal Maximum Power, Maximum power allowed for algorithm window n.
Credit[n]: Power credit left for window n from previous windows. May be positive or negative.

Credit and Max Temporal Power Equations

604

$$Credit[0] = 0$$
$$Credit[n+1] = Credit[n] + \textit{factor} \times (P_{GA} - P_{TA}[n])$$

$$P_{MT}[n] = \begin{cases} P_{MA} & , \{n=0, n=Even\} \\ (P_{GA} + Credit[n]) & , \{n=Odd\} \end{cases}$$

*FIG. 6*

PRECISE POWER CYCLE MANAGEMENT IN DATA STORAGE DEVICES

CROSS REFERENCE TO RELATED APPLICATIONS

This application claims priority to and the benefit of U.S. Provisional Patent Application No. 63/215,969, filed Jun. 28, 2021, entitled "PRECISE POWER CYCLE MANAGEMENT IN DATA STORAGE DEVICES," the entire content of which is incorporated herein as if fully set forth below in its entirety and for all applicable purposes.

FIELD

The subject matter described herein relates to data storage devices and controllers. More particularly, the subject matter relates, in some examples, to the precise power cycle management in data storage devices.

INTRODUCTION

Data storage devices, such as solid-state devices (SSDs), may consume power in different applications. In some cases, SSDs may be incorporated into battery powered computers such as laptops where power consumption is constrained by finite battery power. In other cases, SSDs may be incorporated into cloud computing resources/computers where power may not be physically constrained (e.g., by battery power). However, power efficiency can still be important, especially in cloud computing systems where numerous SSDs may be deployed at once to meet storage demand.

During device operation, two power parameters of interest may be specified. The first parameter is peak power, which may be defined as the maximum power a device may consume. The second parameter is average power, which may be defined as the average power a device may consume. Various approaches for restricting device power usage based on peak power or average power have been proposed. However, existing approaches for addressing power management and power restrictions can be inaccurate and incur power penalties associated with power mode transitions. As a result, existing approaches for addressing power management may yield sub-optimal utilization of allocated power and lower overall device performance.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one aspect, this disclosure relates to a data storage device (DSD), the DSD comprising: a non-volatile memory (NVM); and a processor coupled to the NVM, the processor configured to: determine a first peak power for a first power phase; operate the DSD at a first DSD power consumption that is less than the first peak power for the first power phase; determine a second peak power for a second power phase based on a residual power equal to a difference between a preselected average power threshold and the first DSD power consumption; and operate the DSD at a second DSD power consumption that is less than the second peak power for the second power phase.

In one aspect, this disclosure relates to a method for use with a data storage device (DSD) including a non-volatile memory (NVM), the method comprising: determining a first peak power for a first power phase; operating the DSD at a first DSD power consumption that is less than the first peak power for the first power phase; determining a second peak power for a second power phase based on a residual power equal to a difference between a preselected average power threshold and the first DSD power consumption; and operating the DSD at a second DSD power consumption that is less than the second peak power for the second power phase.

In one aspect, this disclosure relates to a data storage device (DSD), the DSD comprising: a non-volatile memory (NVM); means for determining a first peak power for a first power phase; means for operating the DSD at a first DSD power consumption that is less than the first peak power for the first power phase; means for determining a second peak power for a second power phase based on a difference between a preselected average power threshold and the first DSD power consumption; and means for operating the DSD at a second DSD power consumption that is less than the second peak power for the second power phase.

In one aspect, this disclosure relates to a data storage device (DSD), the DSD comprising: a non-volatile memory (NVM); and a processor coupled to the NVM, the processor configured to: determine a first peak power and a first time period for a first power phase; operate the DSD at a first DSD power consumption that is less than the first peak power for the first time period in the first power phase; determine a second peak power and a second time period for a second power phase based on a residual power equal to a difference between a preselected average power threshold and the first DSD power consumption; and operate the DSD at a second DSD power consumption that is less than the second peak power for the second power phase, wherein the second time period for the second power phase is less than the first time period.

BRIEF DESCRIPTION OF THE DRAWINGS

FIG. 4 is a diagram illustrating exemplary definitions and equations for a first algorithm for power cycle accounting and control in accordance with some aspects of the disclosure.

FIG. 6 is a diagram illustrating exemplary definitions and equations for a second algorithm for power cycle accounting and control in accordance with some aspects of the disclosure.

DETAILED DESCRIPTION

Figure 1:
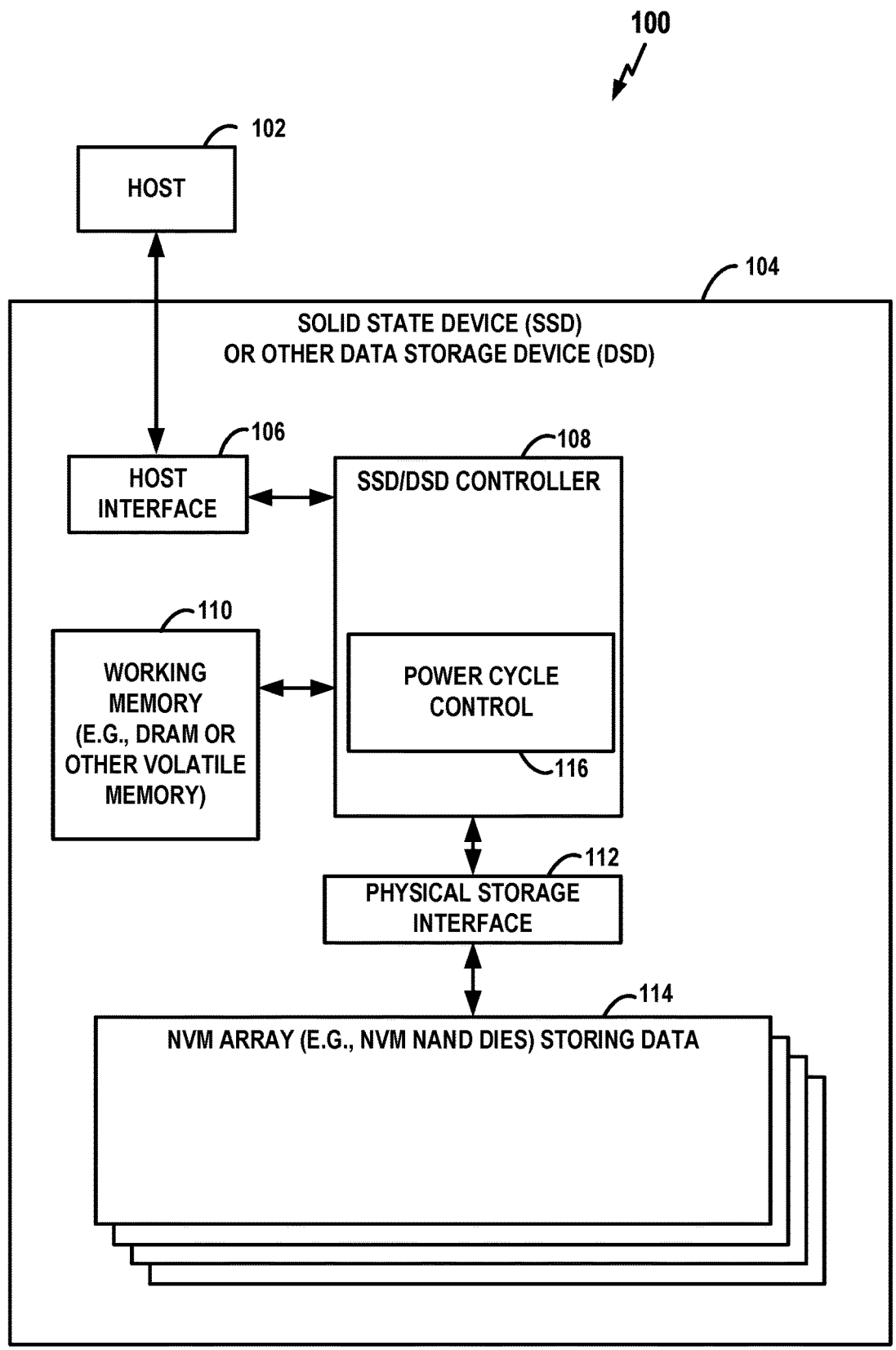
FIG. 1 is a schematic block diagram illustrating an exemplary data storage device (DSD) embodied as a solid-state device (SSD) including an SSD controller configured to perform power cycle accounting and control in accordance with some aspects of the disclosure.

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

The examples herein relate to data storage devices (DSDs) and to data storage controllers of the DSDs. In the main examples described herein, data is stored within non-volatile memory (NVM) arrays. In other examples, data may be stored in hard disk drives (HDD). DSDs with NVM arrays may be referred to as solid state devices (SSDs). Some SSDs use NAND flash memory, herein referred to as "NANDs." A NAND is a type of non-volatile storage technology that does not require power to retain data. It exploits negative-AND, i.e., NAND, logic. For the sake of brevity, an SSD having one or more NAND dies will be used as a non-limiting example of a DSD below in the description of various embodiments. It is understood that at least some aspects described herein may be applicable to other forms of DSDs as well. For example, at least some aspects described herein may be applicable to phase-change memory (PCM) arrays, magneto-resistive random access memory (MRAM) arrays, and resistive random access memory (ReRAM) arrays.

As discussed above, many approaches to power management in SSDs are possible. In one approach, the SSD always operates at or below the allowed average power point. The device never exceeds the allowed average power, not even temporarily for a short time. This approach aligns with some requirements (e.g., maintain average below average power point) but does not fully utilize the device, as will be explained below.

In another approach, the SSD may work in duty cycles. In one window/cycle, it works in full performance while exceeding the allowed average power. In the second window cycle, the device enters low a power state and may execute a restricted set of commands or no commands at all. This is done to compensate for the high power consumed in the previous window/cycle. This duty cycle operation repeats over and over again. In one example of the duty cycle approach, peak power is set at 10 Watts (W) and average power is set at 2 W. In such case, the power usage in a first cycle could be set to 10 W and set to 0 W for the next 4 cycles. In effect, cycle 1 used 8 W over the average and so power usage was set to 0 W for the 4 cycles to offset the 8 W over the average, and thereby reattain the average power over the 5 cycles. The main drawback of this duty cycle approach is the inaccuracy and penalty of power mode transitions. These problems are derived from the granularity of power modes yielding sub-optimal utilization of the allocated power and lower overall performance. Also, this duty cycle approach fails to account for, and therefore may waste, residual power (e.g., power that could have been used in a prior cycle but was not used).

Overview

Aspects of the disclosure relate to improved techniques to account for and control power usage from cycle to cycle. One particular aspect involves a data storage device (DSD) such as an SSD that includes a non-volatile memory (NVM), a processor coupled to the NVM, the processor configured to determine a first peak power for a first power phase, operate the DSD at a first DSD power consumption that is less than the first peak power for the first power phase, determine a second peak power for a second power phase based on a residual power equal to a difference between a preselected average power threshold and the first DSD power consumption, and operate the DSD at a second DSD power consumption that is less than the second peak power for the second power phase. In one aspect, the processor may also be configured to vary time periods for each phase/cycle and/or peak power usage. In one aspect, the improved techniques can vary or fix various parameters of the power cycle control including the cycle time periods and the peak power usage. In one aspect, power consumption in a given phase/cycle is based on both a residual power corresponding to a difference between allowed average power and actual consumed power.

Several advantages are provided by these improved techniques. For example, by precisely accounting for power usage from cycle to cycle (including residual power), the SSD can be fully utilized and have maximum allowed performance while still meeting average power constraints.

Exemplary Devices, Systems and Procedures

FIG. 1 is a schematic block diagram illustrating an exemplary data storage device (DSD) embodied as a solid-state device (SSD) including an SSD controller configured to perform power cycle accounting and control in accordance with some aspects of the disclosure. The system 100 includes a host 102 and the SSD 104 (or other DSD, but for simplicity referred to as an SSD below) coupled to the host 102. The host 102 provides commands to the SSD 104 for transferring data between the host 102 and the SSD 104. For example, the host 102 may provide a write command to the SSD 104 for writing data to the SSD 104 or a read command to the SSD 104 for reading data from the SSD 104. The host 102 may be any system or device having a need for data storage or retrieval and a compatible interface for communicating with the SSD 104. For example, the host 102 may be a computing device, a personal computer, a portable computer, a workstation, a server, a personal digital assistant, a digital camera, or a digital phone as merely a few examples.

The SSD 104 includes a host interface 106, an SSD or DSD controller 108, a working memory 110 (such as DRAM or other volatile memory), a physical storage (PS) interface 112 (e.g., flash interface module (FIM)), and an NVM array 114 having one or more dies storing data. The host interface 106 is coupled to the controller 108 and facilitates communication between the host 102 and the controller 108. The controller 108 is coupled to the working memory 110 as well as to the NVM array 114 via the PS interface 112. The host interface 106 may be any suitable communication interface, such as a Non-Volatile Memory express (NVMe) interface, a Universal Serial Bus (USB) interface, a Serial Peripheral (SP) interface, an Advanced Technology Attachment (ATA) or Serial Advanced Technology Attachment (SATA) interface, a Small Computer System Interface (SCSI), an IEEE 1394 (Firewire) interface, or the like. In some embodiments, the host 102 includes the SSD 104. In other embodiments, the SSD 104 is remote from the host 102 or is contained in a remote computing system communicatively coupled with the host 102. For example, the host 102 may communicate with the SSD 104 through a wireless communication link. The NVM array 114 may include multiple dies.

In some examples, the host 102 may be a laptop computer with an internal SSD and a user of the laptop may wish to playback video stored by the SSD or perform any other memory access function via the SSD. In another example, the host again may be a laptop computer, but the video is stored by a remote server.

Although, in the example illustrated in FIG. 1, SSD 104 includes a single channel between controller 108 and NVM array 114 via PS interface 112, the subject matter described herein is not limited to having a single memory channel. For example, in some NAND memory system architectures, two, four, eight or more NAND channels couple the controller and the NAND memory devices, depending on controller capabilities. In any of the embodiments described herein, more than a single channel may be used between the controller and the memory die, even if a single channel is shown in the drawings. The controller 108 may be implemented in a single integrated circuit chip and may communicate with different layers of memory in the NVM 114 over one or more command channels.

The controller 108 controls operation of the SSD 104. In various aspects, the controller 108 receives commands from the host 102 through the host interface 106 and performs the commands to transfer data between the host 102 and the NVM array 114. Furthermore, the controller 108 may manage reading from and writing to working memory 110 for performing the various functions effected by the controller and to maintain and manage cached information stored in the working memory 110.

The controller 108 may include any type of processing device, such as a microprocessor, a microcontroller, an embedded controller, a logic circuit, software, firmware, or the like, for controlling operation of the SSD 104. In some aspects, some or all of the functions described herein as being performed by the controller 108 may instead be performed by another element of the SSD 104. For example, the SSD 104 may include a microprocessor, a microcontroller, an embedded controller, a logic circuit, software, firmware, application specific integrated circuit (ASIC), or any kind of processing device, for performing one or more of the functions described herein as being performed by the controller 108. According to other aspects, one or more of the functions described herein as being performed by the controller 108 are instead performed by the host 102. In still further aspects, some or all of the functions described herein as being performed by the controller 108 may instead be performed by another element such as a controller in a hybrid drive including both non-volatile memory elements and magnetic storage elements. The SSD controller 108 includes a power cycle control element 116, which can be configured to perform power cycle accounting and control as will be described in further detail below. In one aspect, the power cycle control element 116 can precisely account for peak power available in any cycle and a residual power that represents a difference between an average power threshold and the actual power consumed in a cycle. The residual power may be used in future cycles to maximize power use and to determine power constraints therein.

In one aspect, the power cycle control element 116 is a module within the SSD controller 108 that is controlled by firmware. In one aspect, the power cycle control element or controller 116 may be a separate component from the SSD controller 108 and may be implemented using any combination of hardware, software, and firmware (e.g., like the implementation options described above for SSD controller 108) that can perform power cycle control as will be described in further detail below. In one example, the power cycle control element 116 is implemented using a firmware algorithm or other set of instructions that can be performed on the SSD controller 108 to implement the power cycle control functions described below.

The working memory 110 may be any suitable memory, computing device, or system capable of storing data. For example, working memory 110 may be ordinary RAM, DRAM, double data rate (DDR) RAM, static RAM (SRAM), synchronous dynamic RAM (SDRAM), a flash storage, an erasable programmable read-only-memory (EPROM), an electrically erasable programmable ROM (EEPROM), or the like. In various embodiments, the controller 108 uses the working memory 110, or a portion thereof, to store data during the transfer of data between the host 102 and the NVM array 114. For example, the working memory 110 or a portion of the volatile memory 110 may be a cache memory. The NVM array 114 receives data from the controller 108 via the PS interface 112 and stores the data. In some embodiments, working memory 110 may be replaced by a non-volatile memory such as MRAM, PCM, ReRAM, etc. to serve as a working memory for the overall device.

The NVM array 114 may be implemented using NAND flash memory. In one aspect, the NVM array 114 may be implemented using any combination of NAND flash, PCM arrays, MRAM arrays, and/or ReRAM.

The PS interface 112 provides an interface to the NVM array 114. For example, in the case where the NVM array 114 is implemented using NAND flash memory, the PS interface 112 may be a flash interface module. In one aspect, the PS interface 112 may be implemented as a component of the SSD controller 108.

In the example of FIG. 1, the controller 108 may include hardware, firmware, software, or any combinations thereof that provide the functionality for the power cycle control element 116.

Although FIG. 1 shows an exemplary SSD and an SSD is generally used as an illustrative example in the description throughout, the various disclosed embodiments are not necessarily limited to an SSD application/implementation. As an example, the disclosed NVM array and associated processing components can be implemented as part of a package that includes other processing circuitry and/or components. For example, a processor may include, or otherwise be coupled with, embedded NVM array and associated circuitry. The processor could, as one example, off-load certain operations to the NVM and associated circuitry and/or components. As another example, the SSD controller 108 may be a controller in another type of device and still be configured to perform power cycle control, and perform some or all of the other functions described herein.

Figure 2:
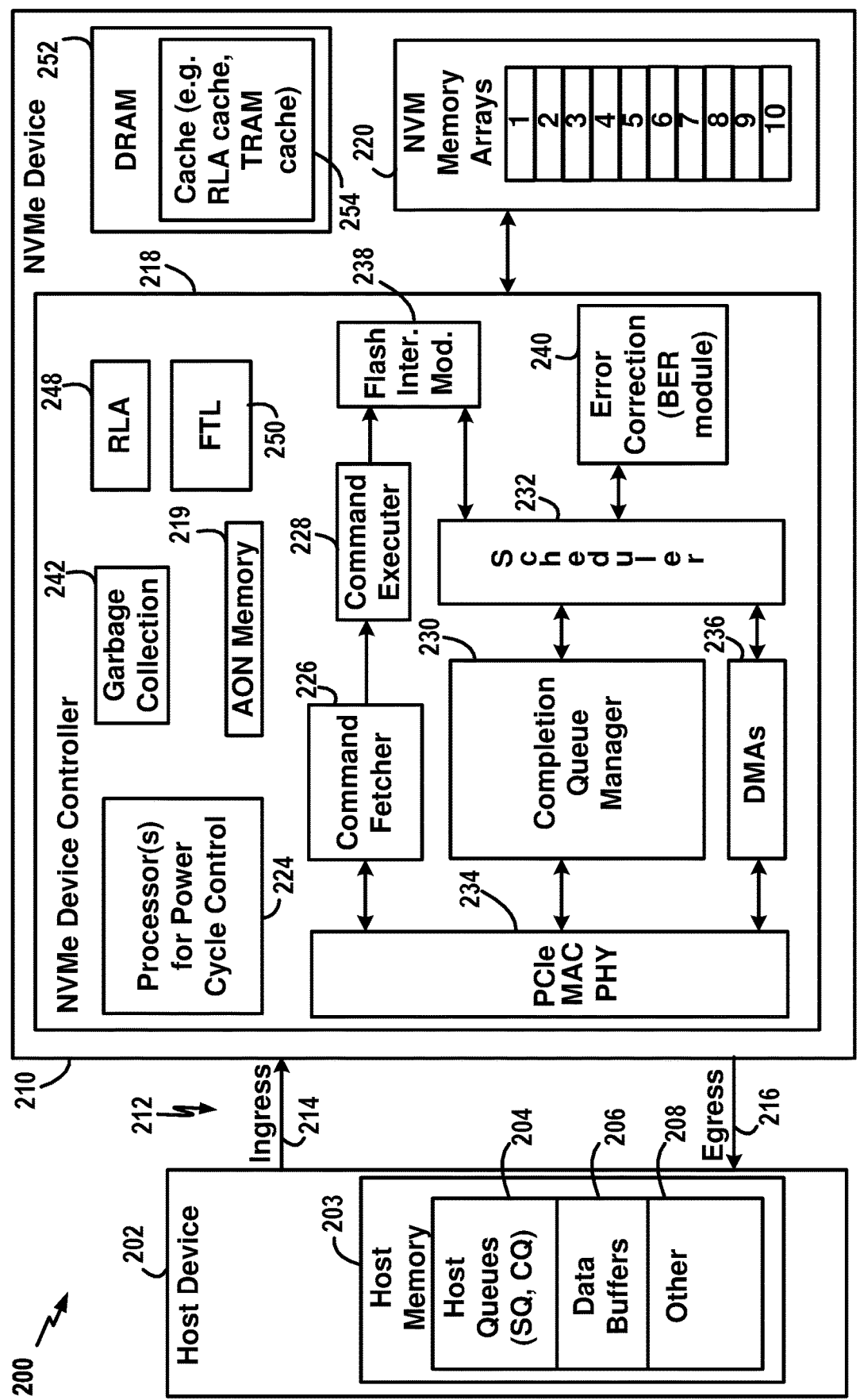
FIG. 2 is a schematic block diagram illustrating an exemplary data storage system with a Non-Volatile Memory express (NVMe) device controller including a processor configured to perform power cycle accounting and control in accordance with some aspects of the disclosure.

In one aspect, the SSD may further include an always on (AON) memory (not shown in FIG. 1 but see 219 in FIG. 2). The AON memory which may be any suitable memory, computing device, or system capable of storing data with a connection to power that does not get switched off. For example, AON memory may be ordinary RAM, DRAM, double data rate (DDR) RAM, static RAM (SRAM), synchronous dynamic RAM (SDRAM), a flash storage, an erasable programmable read-only-memory (EPROM), an electrically erasable programmable ROM (EEPROM), or the like with a continuous power supply. In one aspect, the AON memory may be a RAM with a continuous power supply (e.g., a connection to power that cannot be switched off unless there is a total loss of power to the SSD, such as during a graceful or ungraceful shutdown). In one aspect, the AON memory is a sub-component of the SSD controller. In one aspect, the AON memory is integrated in a sub-component (e.g., a processor such as an AON processor) of the SSD controller.

FIG. 2 is a schematic block diagram illustrating an exemplary data storage system 200 with a Non-Volatile Memory express (NVMe) device 210 including a processor 224 configured to perform power cycle accounting and control in accordance with some aspects of the disclosure. In one aspect, the NVMe device 210 and host device 202 may be used in the DSD of FIG. 1, corresponding to components 104 and 102, respectively. The system includes a host device 202 that may be any suitable computing or processing platform capable of accessing memory on an NVM data storage device to write data using NVMe procedures. The host device 202 includes internal host memory 203, which in this example is dynamic random-access memory (DRAM). The host memory 203 may be configured to include, as shown, various host submission queues (SQs) and completion queues (CQs) 204, data buffers 206 and other memory components 208. The host device 202 may store data in an NVMe storage device 210. The NVMe device 210 may be any suitable device that provides non-volatile memory storage for host device 202 in accordance with NVMe standards. For example, the NVMe device 210 may be a removable storage device, such as a flash SSD that is removably connectable to host device 202. In another example, the NVMe device 210 may be non-removable or integrated within the host device 202. In some embodiments, the host device 202 and the NVMe device 210 are communicatively connected via a PCIe bus 212 (including ingress 214 and egress 216).

The NVMe storage device 210 of FIG. 2 includes an NVMe controller 218 and a non-volatile memory 220. The NVMe controller 218 controls access to the non-volatile memory 220 such as a NAND. The NVMe controller 218 thus may be a non-volatile memory controller that implements or supports the NVMe protocol, and the non-volatile memory 220 may implemented with two dimensional (2D) or three dimensional (3D) NAND flash memory. The NVMe controller includes one or more processors 224 configured to perform power cycle control. The processor(s) 224 are also responsible for the execution of other frond-end and back-end tasks.

In operation, a command fetcher 226 of the NVMe controller 218 fetches commands, such as read requests for data, from the submission queues within the host memory 203 and forwards the commands to a command executer 228. The command fetcher 226 is responsible for fetching and parsing the commands from the host and queuing them internally, and may form part of a front end of the NVMe controller 218. The command executer 228 is responsible for arbitrating and executing the commands. Upon completion of the commands, the NVMe controller 218 generates completion entries that are ultimately directed to the completion queues within the host memory 203. A completion queue manager 230 is responsible for managing the host completion queues. Among other functions, the completion queue manager 230 routes completion entries received from a scheduler 232 to a completion queue within the host device 202 via a PCIe MAC PHY interface 234.

Actual streams of data (obtained as the result of read commands applied to the NVM memory arrays 220) may be delivered to the host device 202 using one or more direct memory access components (DMAs) 236. Additional components of the NVMe controller 218 shown in FIG. 2 include a flash interface module (FIM) 238, which is responsible for controlling and accessing the memory arrays 220, and an error correction code (ECC) component 240, which includes a bit error rate (BER) module.

Additional components of the NVMe controller 218 include: a garbage collection module 242 for controlling garbage collection and related tasks; a read look ahead (RLA) controller 248; and a flash translation (FTL) component 250. Note that some of these components may be part of the flash interface module 238 but are shown separately for the sake of completeness and convenience. The NVMe storage device 210 may additionally include a DRAM 252 (or other working memory), which may include a cache 254.

In one aspect, the power cycle control processor 224 can perform one or more of the actions of process 300 in FIG. 3, perform the functions of the power cycle control element 116 of FIG. 1, or perform any of the power accounting and cycle control algorithms that are described below. In one aspect, the power cycle control processor 224 can be implemented as a single processor. In another aspect, the power cycle control processor 224 can be implemented with a main processor and a secondary processor (e.g., a physical storage or PS processor). The main processor can be directed to performing the general functions of the controller 218, while the PS processor can be directed to performing the functions (e.g., reads and writes) related to communication with the memory arrays 220.

In one aspect, the host 202 or the NVMe device 210 includes or acts as a resource server (e.g., bank) that allocates certain units of power (e.g., tokens or credits) for the device. The techniques described herein for saving power can help the device 210 comply with the power allocations set forth by the resource server.

Power Cycle Accounting and Control

Figure 3:
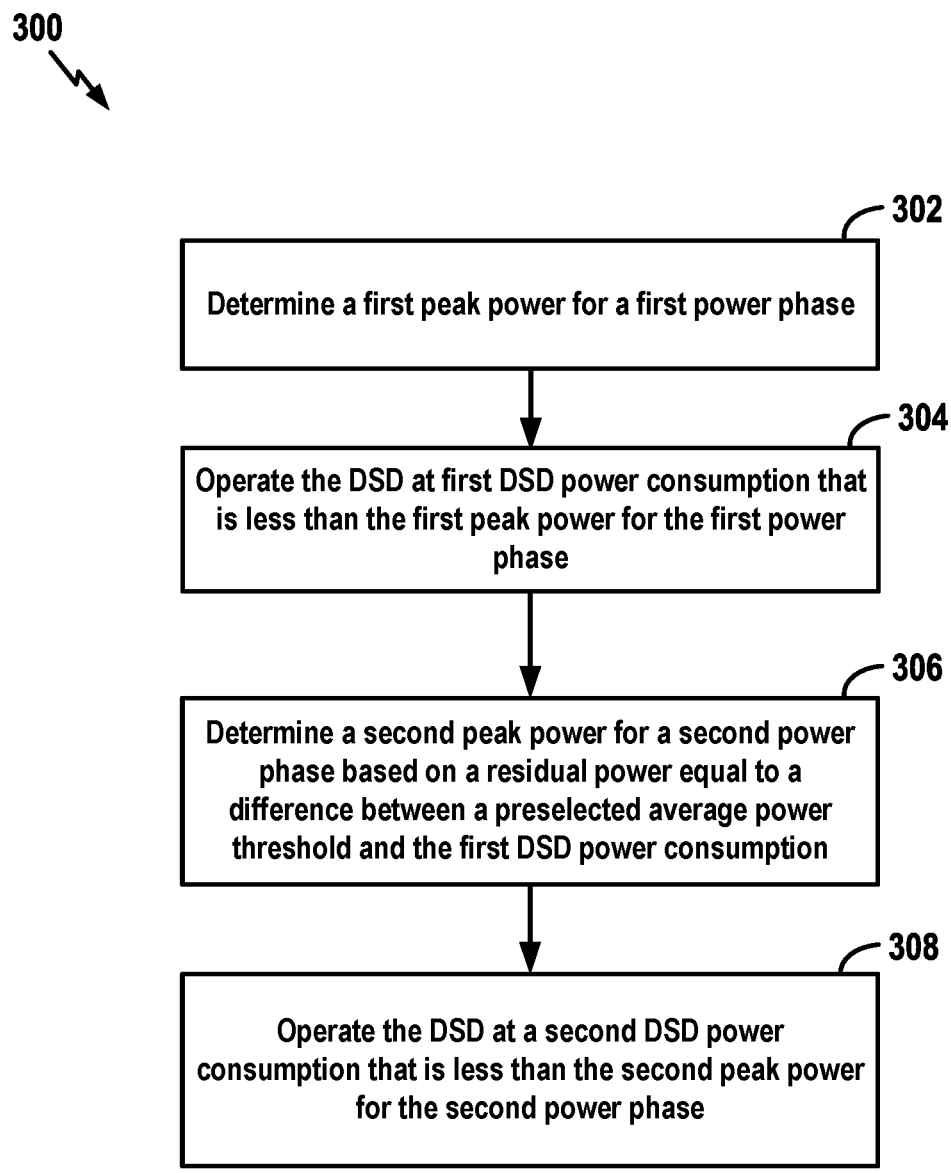
FIG. 3 is a flowchart illustrating a method for power cycle accounting and control that may be performed by a controller of an SSD in accordance with some aspects of the disclosure.

FIG. 3 is a flowchart illustrating a method for power cycle accounting and control that may be performed by a controller of an SSD in accordance with some aspects of the disclosure. In one aspect, the method/process 300 may be performed by the SSD/DSD controller 108 (or power cycle control arbiter 116) of FIG. 1, or the NVMe controller 218 (or processor 224) of FIG. 2, or any other suitably equipped device controller (such as 906 in FIGS. 9 and 1000 in FIG. 10).

At block 302, the process determines a first peak power for a first power phase. The first power phase may also be referred to as a first power cycle. In one aspect, the first peak power may be specified by a host device. In one aspect, the first peak power may be specified by the SSD. In one aspect, the first peak power may be determined as a function of peak power parameters specified by the host and/or SSD. In one aspect, the first peak power can be defined as a maximum allowed power for a given phase/cycle/window. In one aspect, the first peak power may be quantified using tokens. Further details of these features will be described below.

At block 304, the process operates the data storage device (DSD such as an SSD) at a first DSD power consumption that is less than the first peak power for the first power phase. In one aspect, for example, an SSD processor controls power rail circuitry in the SSD to control power parameters such as peak power, average power, root mean square (RMS) power, and the like that the SSD may use in a given cycle, such as the first power phase. This power rail circuitry or other suitable circuity in the SSD may also measure the power consumption by SSD over a period of time such as the first power phase/cycle. The first DSD power consumption may be based on current device needs, and in some cases, power consumption in past cycles.

At block 306, the process determines a second peak power for a second power phase based on a residual power equal to a difference between a preselected average power threshold and the first DSD power consumption. In one aspect, the residual power can be a positive value (e.g., where the preselected average power threshold was greater than the power consumed in first phase (first DSD power consumption)). In one aspect, the residual power can be a negative value (e.g., where the power consumed in first phase was greater than preselected average power threshold).

At block 308, the process operates the DSD at a second DSD power consumption that is less than the second peak power for the second power phase. In one aspect, for example, where the residual power is negative because the SSD used more power in the first phase than the average power threshold (e.g., host guaranteed average power), the second peak power is determined (based on the residual power), and the SSD operated such that the second DSD power consumption is less than the second peak power specified for the second phase/cycle. Thus, by determining a phase specific peak power limit and controlling the power for that phase to be less than the phase specific peak power limit, the SSD may be operated without a switch/transition to a low power mode and while accounting for (and using if so desired) the exact amount of power headroom (usable power) it has based on prior power consumption. In this case, the first phase/cycle can be referred to as a loan phase, and subsequent phase(s) can be referred to as payment phase(s). The payback could occur over one or more cycles. These loan and payment phases can keep repeating, and the process can subject these phases to constraints related to peak power per phase, phase duration, and average power per phase. Further details on these features will be described below.

In one aspect, the process can also determine a preselected second phase time period (e.g., second phase duration) based on the residual power, and operate the SSD in the second power phase for the preselected second phase time period.

In one aspect, the process can determine a power cost for entry into, and exit from, the second power phase, and then the second DSD power consumption can be based on the residual power and the power cost. In one aspect, the process can determine the power cost on an experimental basis where it determines the power (e.g., average power) used to transition from one cycle to another. In one aspect, the process can retrieve power cost information stored in a memory, where the power cost information is preconfigured for, or otherwise provided to, the SSD. In one aspect, the process can determine the power cost on a cycle-by-cycle basis.

In one aspect, the process can also determine a preselected second phase time period based on the power cost, and then operate the DSD/SSD in the second power phase for the preselected second phase time period.

In one aspect, the process can also set a peak power to a fixed value for the first power phase, the second power phase, and one or more subsequent power phases.

In one aspect, the process can vary a peak power among (e.g., among at least two of) the first power phase, the second power phase, and subsequent power phases.

In one aspect, positive peak power values (e.g., when residual power is positive) can be variable, while negative peak power values (e.g., when residual power is negative) can be fixed. In one aspect, positive peak power values can be fixed, while negative peak power values can be variable. In one aspect, both positive peak power values and negative peak power values can be variable.

In one aspect, the process can also set a preselected time period for the first power phase, the second power phase, and one or more subsequent power phases to a fixed value.

In one aspect, the process can also vary a preselected time period among (among at least two of) the first power phase, the second power phase, and subsequent power phases.

In one aspect, the duration (e.g., time period) of positive peak power values can be variable, while the duration of negative peak power values can be fixed. In one aspect, the duration of positive peak power values can be fixed, while the duration of negative peak power values can be variable. In one aspect, both durations for positive peak power values and negative peak power values can be variable. In one aspect, a summation of these durations (e.g., across adjacent periods) is made to be a constant, thereby maintaining a preselected degree of pulse width modulation (PWM).

In one aspect, positive peak power values, negative peak power values, and the corresponding durations/periods can all be variable.

In one aspect, the process can control power such that a power consumption in any subsequent power mode to the second power phase is based on a residual power of each of the prior phase power modes.

In one aspect, and as discussed above, the process may also receive commands from a host device and execute the commands using the NVM before, during, or after any of the phases described above.

In one aspect, the process may perform additional actions as described below for the various power cycle and control algorithms.

FIG. 4 is a diagram illustrating exemplary definitions 402 and equations 404 for a first algorithm for power cycle accounting and control in accordance with some aspects of the disclosure. In one aspect, the first algorithm can be performed by the power cycle control element 116 of FIG. 1, the processor 224 of FIG. 2, or any other suitable SSD processor (such as 906 in FIGS. 9 and 1000 in FIG. 10). As shown in the equations 402, initially the power credit is set to zero. In subsequent windows/phases/cycles, the power credit (e.g., Credit[n+1]) is equal to the credit from the prior phase/window (Credit[n]) plus the difference of the guaranteed average power ($P_{GA}$) and the temporal average power of the prior window ($P_{TA}[n]$). The temporal maximum power (e.g., peak power allowed for window n) $P_{MT}$ is equal to the maximum allowed power per window $P_{MA}$ for the cases when n is 0 or n is even. The temporal maximum power $P_{MT}$ is equal to $P_{GA}$ plus Credit[n] (e.g., residual power) where n is odd. Thus, for an initial window (n=0) $P_{MT}$ is $P_{MA}$ or maximum allowed power. For the next window, where n is odd, it becomes $P_{GA}$ plus Credit[n]. In this way, the first algorithm accounts for a difference in guaranteed average power (e.g., specified by the host or another entity) and temporal average power (e.g., actual power used in a given phase/window). In a slight modification, the credit can also, or instead, be based on a difference in the peak power and the temporal average power.

Figure 5:
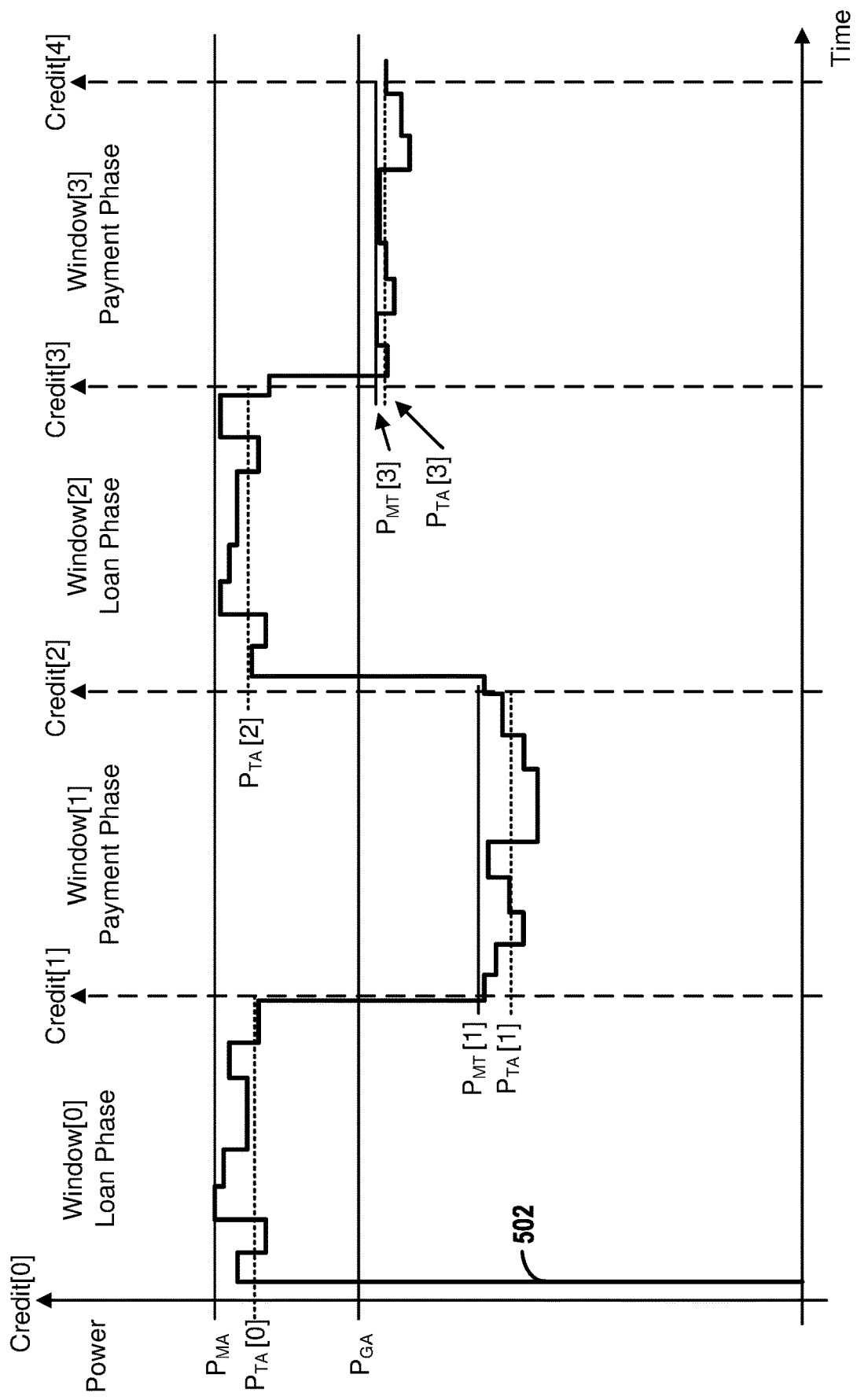
FIG. 5 is a power cycle timing diagram illustrating an exemplary power consumption in a data storage system configured to perform the first algorithm for power cycle accounting and control illustrated in FIG. 4.

FIG. 5 is a power cycle timing diagram illustrating an exemplary power consumption 502 in a data storage system configured to perform the first algorithm for power cycle accounting and control illustrated in FIG. 4. The timing diagram illustrates power on the vertical axis versus time on the horizontal axis. Vertical lines marked by Credit[0], Credit[1], Credit[2], Credit[3], Credit[4] define windows/cycles/phases marked by Window[0], Window[1], Window [2], and Window[3]. In Window[0] (e.g., a first phase), the temporal average power $P_{TA}[0]$ is above the guaranteed average power $P_{GA}$, and thus Window[0] may be considered a loan phase, whereby subsequent phases may need to use less than $P_{GA}$ to achieve an average power closer to $P_{GA}$. In Window [1] (e.g., a second phase), the temporal average power $P_{TA}[1]$ is made to be below the guaranteed average power $P_{GA}$, and thus Window[1] may be considered a payment phase. In one aspect, the overall average power may be made to be closer to $P_{GA}$ across multiple payment phases, instead of just one phase. In Window[2], the temporal average power $P_{TA}[2]$ is above the guaranteed average power $P_{GA}$ again, and thus Window[2] may be considered another loan phase. In Window [3], the temporal average power $P_{TA}[3]$ is made to be below the guaranteed average power $P_{GA}$, and thus Window[3] may be considered another payment phase. As used in FIG. 5 and similar drawings described herein, "above" can mean "greater than" and "below" can mean "less than."

In one aspect, the credits computed and power constraints are all measured or counted using discrete tokens. In one aspect, this first algorithm and/or the other methods described herein seek to fully utilize the N tokens (e.g., a total number of tokens budgeted for a given system) allocation by setting the number of tokens, N(t), as a time-varying value defining a moving average power consumed by the system. Within the definition of N(t) as a "moving average" power, peak power levels can be defined such that the system will utilize the different quanta of tokens requested by different requestors in a more optimal manner. Peak power levels are power tokens that are allocated to the system beyond (positive peak power period) and below (negative peak power period) the target moving average. As discussed above, in one aspect, the algorithms described herein can modulate the resulting energy by varying time periods and varying token budget amplitude. Stated another way, in one aspect, the techniques described herein can involve a method of accounting for power consumption of individual and multiple DSD operations that is based on use of discrete tokens managed by one or more dedicated processors, where tokens are selected at a minimum quantum in order to optimize power management resolution along with calibrating the number of tokens describing the power profile spent by said individual and multiple DSD operations. The one or more processors can control the peak, average, and/or root mean square (RMS) power for one or more power rails fed into the DSD in a time-varying method employing the loan/payment strategy proposed herein.

In one aspect, the techniques described herein seek to capture all residual (e.g., unused) power in the SSD. Tasks or components working within the SSD can get a fixed number of tokens periodically (e.g., per window or cycle). If a task or component needs more power/tokens than are allocated, the additional tokens can be obtained with a "loan" (effectively borrowing from future cycles). The SSD controller/processor can manage the tokens. In one aspect, it may allocate/grant tokens within milliseconds or microseconds.

As shown in FIG. 5, the first algorithm can involve a scheme in which storage device works in two power/performance phases. The device switches between those phases cyclically. The first phase is the "loan" phase, and the second phase is the "payment" phase. In the loan phase, the storage device exceeds the allowed average power while increasing the performance. In the payment phase, storage device usually works below the allowed average power while compensating for the previous loan phase. Usually, the performance at the payment phase is lower. Loan and payment phases may account for one or more phases, enabling long term compensation for increasing performance stability. For example, in one aspect, the algorithm can provide for Q loan phases followed by W payment phases, where Q and W may also have varying time values/durations. The table below summarizes the attributes of the loan and payment phases.

| Phase | Power | Performance |
| --- | --- | --- |
| Loan | >average power | High |
| Payment | <average power | Low |

In one aspect, and as described above, shifting between power modes can be pricey, where the price/cost is based on transition latency and transition power consumption. As a result, it is not preferred to modulate power in an analog way, and the granularity of transitions is preferred to be relatively coarse (e.g., on the order of 1 milliseconds (ms) or 100 ms, or somewhere in between). In one aspect, one cycle or one window can take about 200 ms. In one aspect, and as mentioned above, the processor or first algorithm can take into account the cost of entry and exit to a given power state/mode. This cost can be used to determine the size of cycles/windows for a given power phase/mode. In theory, it might be best to have the smallest possible window size to achieve the best accuracy, but this is not practical due to price/cost of power state transitions. More specifically, power management is associated with a performance function that takes into account the cost of implementing power management and the power gain from that power management. By implementing variable power window periods as described herein, power switching events are inferred which bear a system cost defined by three elements. The first element, transient power spent switching power states, involves charging a capacitive load (e.g., a CPU or SRAM memory) with a limited current yielding power loss on supply elements, and turning on clock sources requiring transient power. The second element, loss of performance and subsequent power loss, may occur while the SSD is running through a sequence including stages for powering up or powering down. Turning power off may require multiple stages of draining stateful data (e.g., data related to the state of an SSD or component thereof at a particular time) to the NVM, turning off multiple clocks and power sources in an orderly sequence. The third element, hardware (PMIC, passives), silicon (CPUs, SRAM, accelerators) and software overheads, may be required to manage the power transition and track the power strategy resulting in added system complexity and development time. In one example, a minimum power state window should be much larger (e.g., roughly 10-100 times) than the combined time of entry and exit latencies. For example, if an SSD requires 20 microseconds to enter a low power state and requires 30 microseconds to exit the low power state, then the minimum window size could be defined as 20 times the total of 50 microseconds, which equates 1 millisecond. In other examples, other suitable durations can be used for the minimum window size.

Since changing power modes may have costs in term of "time to take effect" and in terms of power (e.g., wasted power used to transition from one mode to the other), the processor or first algorithm may consider the efficiency to transition to a different power mode by taking in to account the extra constraints mentioned. In one example, the transition cost may cause a transition from a mode-A to a mode-C, instead of a transition to a mode-B if there was no change cost involved. Thus, the transition cost can affect the decision to transition, when to transition, and what will be the transition (e.g., some transitions may affect the processor (or SSD controller) alone and others may affect an external power supply as well). In one aspect, some transitions may require to the SSD to save data before the transition for data retention and some transitions will not.

In one aspect, the first algorithm can be a converging and/or recurring algorithm. In one aspect, the first algorithm can be implemented using linear logic, discrete logic, or based on machine learning. In one aspect, a number of parameters can be considered by the first algorithm in deciding the peak power to be allocated and the duration of windows. These parameters can include a number of tokens, a window size, a minimum/maximum number of tokens per window, maximum power allowed from the system/SSD, maximum average power, temperature targets, peak performance, maximum latency allowed, and minimum performance allowed (e.g., in terms of minimum read/write throughput required). One or more of these parameters may be specified by the host.

FIG. 6 is a diagram illustrating exemplary definitions 602 and equations 604 for a second algorithm for power cycle accounting and control in accordance with some aspects of the disclosure. In one aspect, the second algorithm can be performed by the power cycle control element 116 of FIG. 1, the processor 224 of FIG. 2, or any other suitable SSD processor (such as 906 in FIGS. 9 and 1000 in FIG. 10). The definitions 602 and equations 604 in FIG. 6 are substantially the same as those shown in FIG. 4, except for the "factor" term used in the Credit[n+1] equation. In one aspect, the "factor" term can be set based on a relative size of windows desired for the loan and payment phases. In effect, the factor helps to ensure that the loan and payment phases are not symmetric with respect to time (e.g., phases could be asymmetric in time). This means that the loan window could be longer than the payment window. This may be implemented to utilize the drive even more (e.g., extract even greater overall performance).

In another aspect, and as alluded to above, the phases might not be fixed in time. Instead, every cycle might have a different duration depending on the current state of the drive, urgency of pending activities and/or quality of service.

Figure 7:
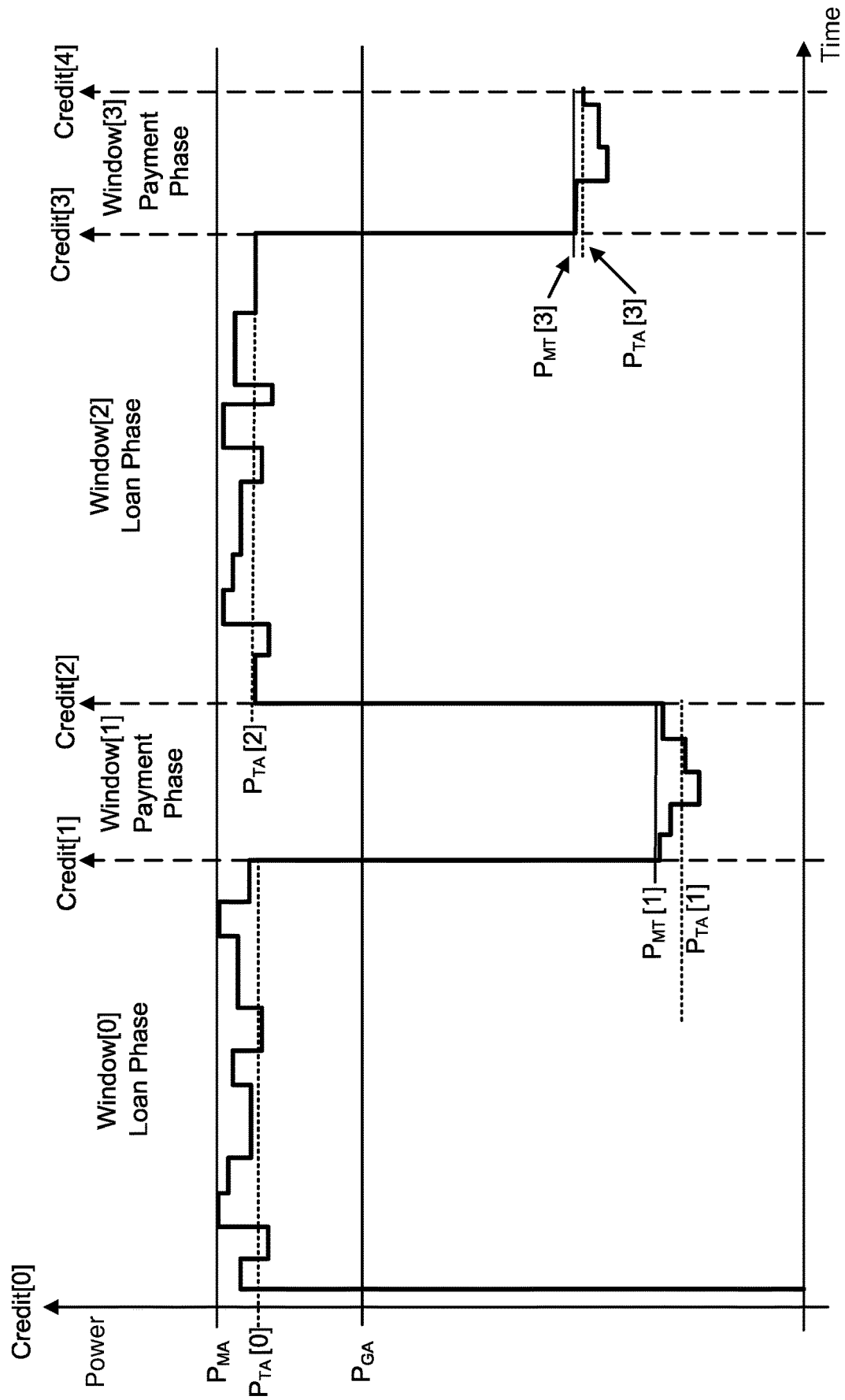
FIG. 7 is a power cycle timing diagram illustrating an exemplary power consumption in a data storage system configured to perform the second algorithm for power cycle accounting and control illustrated in FIG. 6.

FIG. 7 is a power cycle timing diagram illustrating an exemplary power consumption in a data storage system configured to perform the second algorithm for power cycle accounting and control illustrated in FIG. 6. FIG. 7 is substantially similar to the power cycle timing diagram of FIG. 5, except that the windows/phases are asymmetric, and more specifically, the loan phase is substantially longer than the payment phase. As discussed above, this can result in even greater overall performance, possibly depending on the particular load applied to the SSD.

Figure 8:
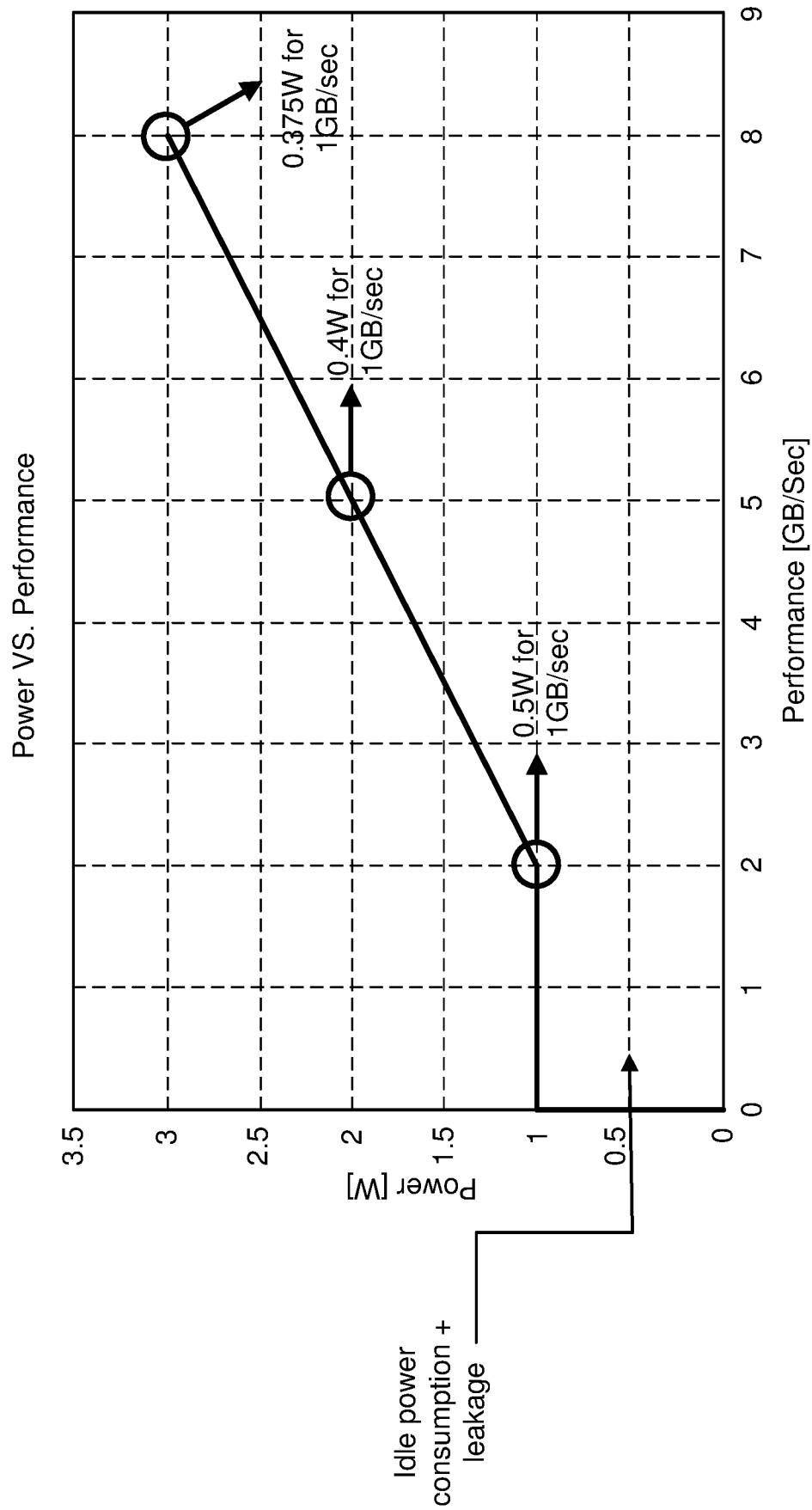
FIG. 8 is a plot that illustrates consumed power as a function of performance for a data storage system in accordance with some aspects of the disclosure.

FIG. 8 is a plot that illustrates consumed power as a function of performance for a data storage system in accordance with some aspects of the disclosure. FIG. 8 shows that, in a relatively low performance range, there is a baseline or fixed power consumption which represents the leakage and base power. After crossing this minimum bar (e.g., at about 2 gigabits per second (GB/sec), higher performance and consequently higher consumed power is achieved. However, even in this zone, when possible, it is more efficient to work in the highest consumed power point (3 W at 8 GB/sec or 0.375 W for 1 GB/sec) since at this point the consumed power per unit of bandwidth is minimal. In this example, the right most zone (e.g., at 3 W at 8 GB/sec) is the best operating point since only 0.375 W is consumed per performance of 1 GB/Sec. Thus, FIG. 8 demonstrates that the most efficient performance for an SSD may occur at higher power consumption states.

One advantage of the power cycle control techniques described herein is efficient power management which can be especially useful in various SSD markets, including consumer SSDs. These techniques may enable the system to work in the maximum possible performance for a specific average power requirement. These techniques may also enable the system to accumulate unused energy and use it later to be as close as possible to 100 percent energy utilization.

In the following, various general exemplary procedures and systems are described.

Additional Exemplary Apparatus

Figure 9:
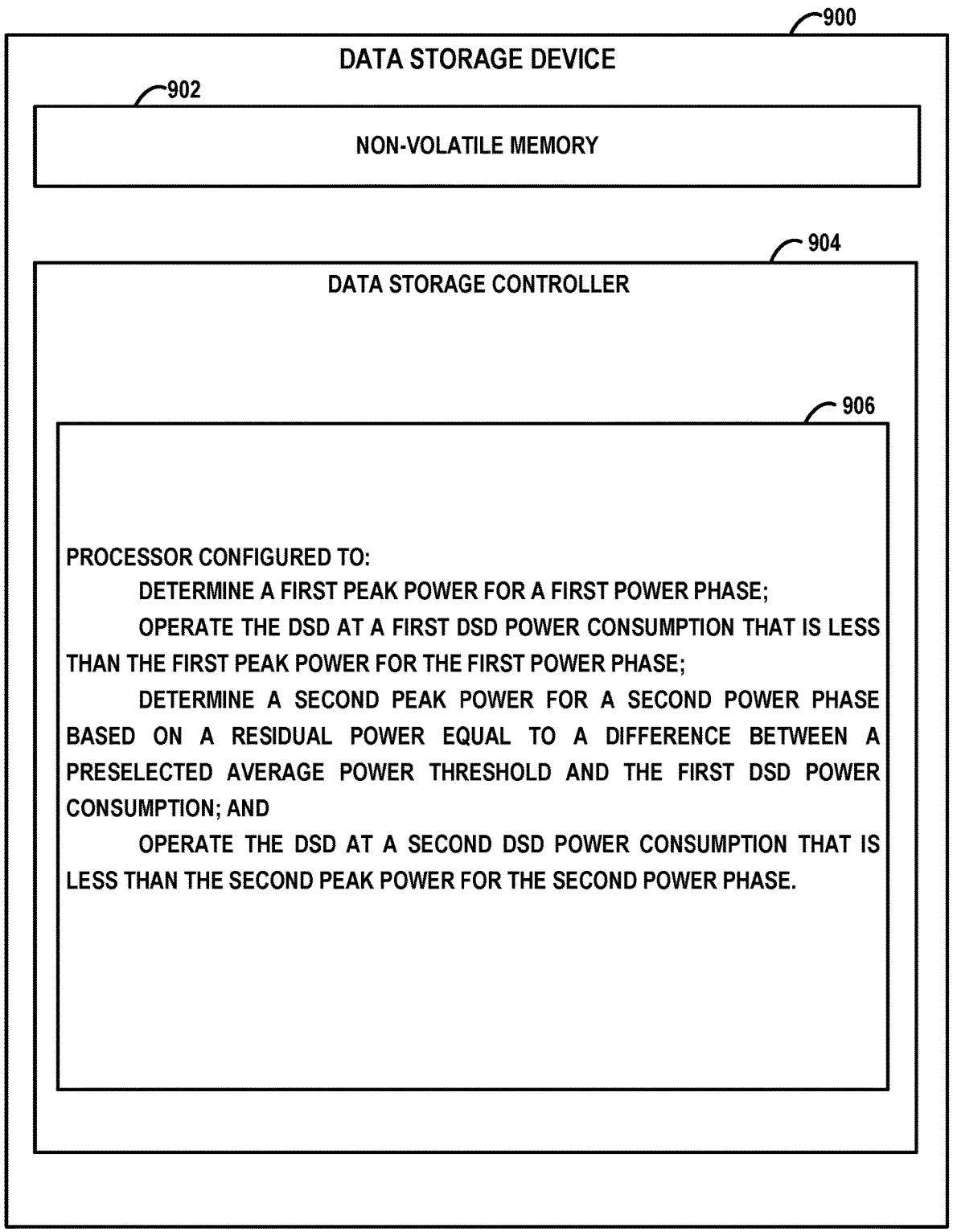
FIG. 9 is a schematic block diagram illustrating an exemplary data storage device configured in accordance with some aspects of the disclosure.

FIG. 9 is a schematic block diagram illustrating an exemplary data storage device 900 configured in accordance with some aspects of the disclosure. The data storage device 900 includes a non-volatile memory (NVM) 902 and a data storage controller 904. The data storage controller 904 includes a processor or processing circuit 906 configured to determine a first peak power for a first power phase; operate the DSD at a first DSD power consumption that is less than the first peak power for the first power phase; determine a second peak power for a second power phase based on a residual power equal to a difference between a preselected average power threshold and the first DSD power consumption; and operate the DSD at a second DSD power consumption that is less than the second peak power for the second power phase.

The processor 906 may also be configured to determine a preselected second phase time period based on the residual power; and operate the DSD in the second power phase for the preselected second phase time period.

The processor 906 may also be configured to determine a power cost for entry into, and exit from, the second power phase; and where the second DSD power consumption is based on the residual power and the power cost.

The processor 906 may also be configured to determine a preselected second phase time period based on the power cost; and operate the DSD in the second power phase for the preselected second phase time period.

The processor 906 may also be configured to set a peak power to a fixed value for the first power phase, the second power phase, and one or more subsequent power phases to a fixed value.

The processor 906 may also be configured to vary a peak power among at least two of: the first power phase, the second power phase, and subsequent power phases.

The processor 906 may also be configured to set a preselected time period to a fixed value for the first power phase, the second power phase, and one or more subsequent power phases to a fixed value.

The processor 906 may also be configured to vary a preselected time period among at least two of: the first power phase, the second power phase, and subsequent power phases.

The processor 906 may also be configured to control the DSD such that a power consumption in any subsequent power mode to the second power phase is based on a residual power of each of the prior power phases.

The processor 906 may also be configured to receive commands from a host device, and execute the commands using the NVM.

Figure 10:
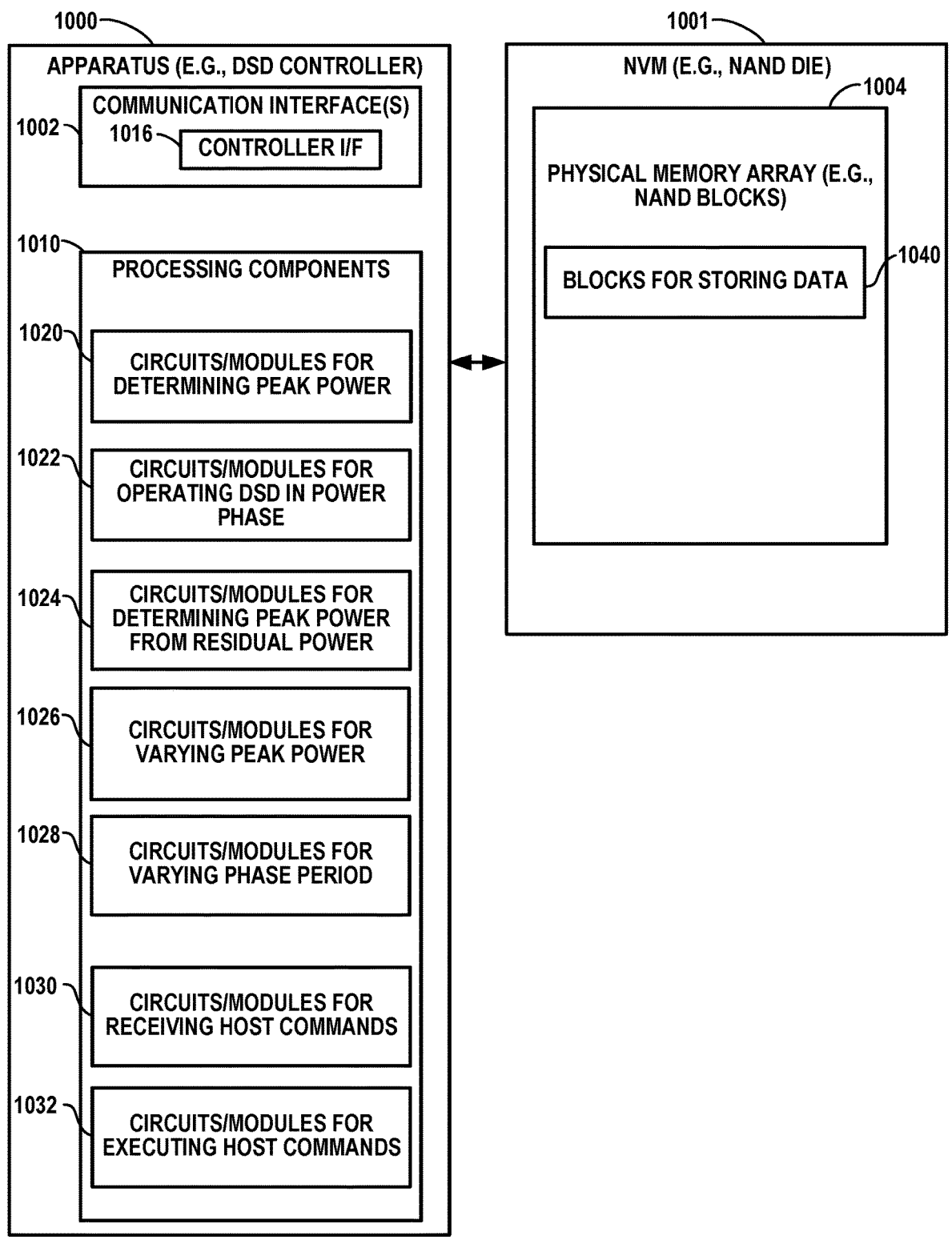
FIG. 10 is a schematic block diagram configuration for an exemplary data storage device configured in accordance with some aspects of the disclosure.

FIG. 10 illustrates an embodiment of an exemplary data storage device 1000 configured according to one or more aspects of the disclosure. The apparatus 1000, or components thereof, could embody or be implemented within a data storage controller such as a DSD controller coupled to a volatile memory (not shown) and a NAND die or some other type of NVM array that supports data storage. In various implementations, the apparatus 1000, or components thereof, could be a component of a processor, a controller, a computing device, a personal computer, a portable device, workstation, a server, a personal digital assistant, a digital camera, a digital phone, an entertainment device, a medical device, a self-driving vehicle control device, an edge device, or any other electronic device that stores, processes, or uses data.

The apparatus 1000 includes a communication interface 1002 and is coupled to a NVM 1001 (e.g., a NAND die). The NVM 1001 includes physical memory array 1004. These components can be coupled to and/or placed in electrical communication with one another via suitable components, represented generally by the connection line in FIG. 10. Although not shown, other circuits such as timing sources, peripherals, voltage regulators, and power management circuits may be provided, which will not be described any further.

The communication interface 1002 of the apparatus 1000 provides a means for communicating with other apparatuses over a transmission medium. In some implementations, the communication interface 1002 includes circuitry and/or programming (e.g., a program) adapted to facilitate the communication of information bi-directionally with respect to one or more devices in a system. In some implementations, the communication interface 1002 may be configured for wire-based communication. For example, the communication interface 1002 could be a bus interface, a send/receive interface, or some other type of signal interface including circuitry for outputting and/or obtaining signals (e.g., outputting signal from and/or receiving signals into a DSD).

The physical memory array 1004 may include one or more NAND blocks 1040. The physical memory array 1004 may be accessed by the processing components 1010.

In one aspect, the apparatus 1000 may also include volatile memory (not shown here) for storing instructions and other information to support the operation of the processing components 1010.

The apparatus 1000 includes various processing components 1010 arranged or configured to obtain, process and/or send data, control data access and storage, issue or respond to commands, and control other desired operations. For example, the components 1010 may be implemented as one or more processors, one or more controllers, and/or other structures configured to perform functions. According to one or more aspects of the disclosure, the components 1010 may be adapted to perform any or all of the features, processes, functions, operations and/or routines described herein. For example, the components 1010 may be configured to perform any of the steps, functions, and/or processes described with respect to FIGS. 1-9, 11. As used herein, the term "adapted" in relation to components 1010 may refer to the components being one or more of configured, employed, implemented, and/or programmed to perform a particular process, function, operation and/or routine according to various features described herein. The circuits may include a specialized processor, such as an ASIC that serves as a means for (e.g., structure for) carrying out any one of the operations described, e.g., in conjunction with FIGS. 1-9, 11. The components 1010 serve as an example of a means for processing. In various implementations, the components 1010 may provide and/or incorporate, at least in part, functionality described above for the components of controller 108 of FIG. 1, controller 218 of FIG. 2, or controller 906 of FIG. 9.

According to at least one example of the apparatus 1000, the processing components 1010 may include one or more of: circuit/modules 1020 configured for determining peak power; circuits/modules 1022 configured for operating a DSD in a power phase (e.g., first power phase, second power phase, etc.); circuits/modules 1024 configured for determining peak power from residual power; circuits/modules 1026 configured for varying peak power; circuits/modules 1028 configured for varying phase period; circuits/modules 1030 configured for receiving host commands; and circuits/modules 1032 configured for executing host commands.

The physical memory array 1004 may include blocks 1040 for storing data.

In at least some examples, means may be provided for performing the functions illustrated in FIG. 10 and/or other functions illustrated or described herein. For example, the means may include one or more of: means, such as circuit/module 1020, for determining a first peak power for a first power phase; means, such as circuit/module 1022, for operating the DSD at a first DSD power consumption that is less than the first peak power for the first power phase; means, such as circuit/module 1024, for determining a second peak power for a second power phase based on a difference between a preselected average power threshold and the first DSD power consumption; and means, such as circuit/module 1022, for operating the DSD at a second DSD power consumption that is less than the second peak power for the second power phase.

In at least some other examples, means may be provided for performing the functions illustrated in FIG. 10 and/or other functions illustrated or described herein. For example, the means may include one or more of: means, such as circuit/module 1028, for determining a preselected second phase time period based on the residual power; means, such as circuit/module 1022, for operating the DSD in the second power phase for the preselected second phase time period; means, such as circuit/module 1024, for determining a power cost for entry into, and exit from, the second power phase, wherein the second DSD power consumption is based on the residual power and the power cost; means, such as circuit/module 1028, for determining a preselected second phase time period based on the power cost; means, such as circuit/module 1022, for operating the DSD in the second power phase for the preselected second phase time period; means, such as circuit/module 1026, for setting a peak power for the first power phase, the second power phase, and one or more subsequent power phases to a fixed value;

means, such as circuit/module 1026, for varying a peak power among at least two of: the first power phase, the second power phase, and subsequent power phases; means, such as circuit/module 1028, for setting a preselected time period for the first power phase, the second power phase, and one or more subsequent power phases to a fixed value; means, such as circuit/module 1028, for varying a preselected time period among at least two of: the first power phase, the second power phase, and subsequent power phases; means, such as circuit/module 1030, for receiving commands from a host device; and means, such as circuit/module 1032, for executing the commands using the NVM.

Figure 11:
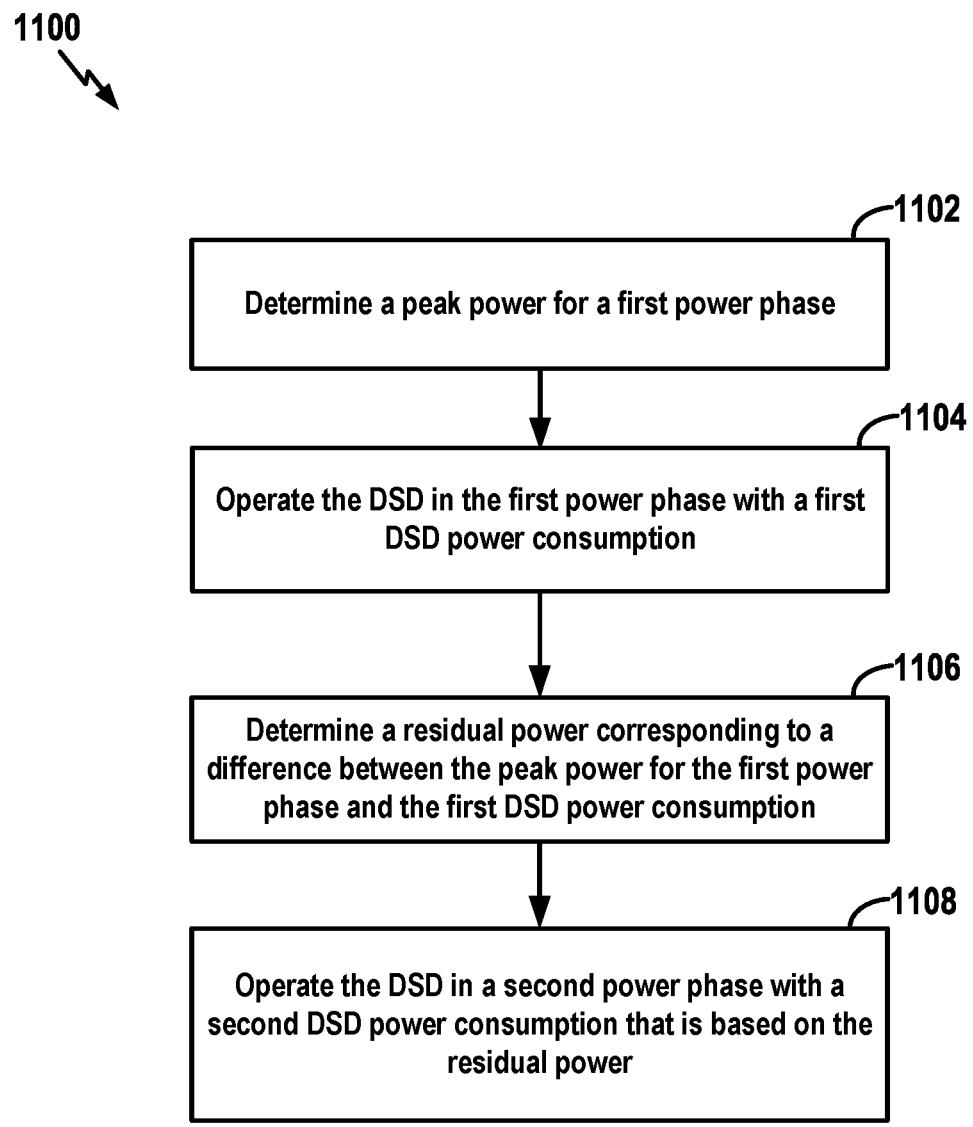
FIG. 11 is a flowchart illustrating a method for power cycle accounting and control that may be performed by a controller of an SSD in accordance with some aspects of the disclosure.

FIG. 11 is a flowchart illustrating a method for power cycle accounting and control that may be performed by a controller of an SSD in accordance with some aspects of the disclosure. In one aspect, the method/process 1100 may be performed by the SSD/DSD controller 108 (or power cycle control arbiter 116) of FIG. 1, or the NVMe controller 218 (or processor 224) of FIG. 2, or any other suitably equipped device controller (such as 906 in FIGS. 9 and 1000 in FIG. 10).

At block 1102, the process determines a peak power for a first power phase. The first power phase may also be referred to as a first cycle power mode. In one aspect, the peak power may be specified by a host device. In one aspect, the peak power may be specified by the SSD. In one aspect, the peak power may be determined as a function of peak power parameters specified by the host and/or SSD. In one aspect, the peak power can be defined as a maximum allowed power for a given cycle/window/phase. In one aspect, the peak power may be quantified using tokens, as is described above.

At block 1104, the process operates the data storage device (DSD such as an SSD) in the first power phase using a first DSD power consumption. In one aspect, for example, an SSD processor controls power rail circuitry in the SSD to control power parameters such as peak power, average power, root mean square (RMS) power, and the like that the SSD may use in a given cycle, such as the first power phase. This power rail circuitry or other suitable circuitry in the SSD may also measure the power consumption by SSD over a period of time such as the first power phase. The first DSD power consumption may be based on current device needs, and in some cases, power consumption in past cycles.

At block 1106, the process determines a peak residual power corresponding to a difference between the peak power for the first power phase and the first DSD power consumption. In one aspect, the peak residual power can be a positive value (e.g., peak power was greater than power consumed in first phase). In one aspect, the peak residual power can be a negative value (e.g., power consumed in first phase was greater than peak power).

At block 1108, the process operates the DSD in a second power phase using a second DSD power consumption that is based on the peak residual power. In one aspect, for example, where the peak residual power is positive because the SSD used less power in the first phase than the peak power, the second DSD power consumption can be greater than a peak power specified for the second phase/cycle (e.g., up to the value of the peak residual power). As an example, suppose the first phase peak power is 10 W and the first phase power consumption was 7 W. As a result, the second phase power consumption could go up to 13 W. In one aspect, where the peak residual power is negative because the SSD used more power in the first phase than the peak power, the second DSD power consumption can be less than a peak power specified for the second phase/cycle. In this case, the first phase/cycle can be referred to as a loan phase, and subsequent phase(s) can be referred to as payment phase(s). The payback could occur over one or more cycles. These loan and payment phases can keep repeating, and the process can subject these phases to constraints related to peak power per phase, phase duration, and average power per phase.

In one aspect, the method of FIG. 11 can be used in place of, or in conjunction with, the method of FIG. 3 and the algorithms of FIGS. 5 and 7 to control power consumption per phase in an SSD.

In one aspect, the process can also determine a preselected second phase time period (e.g., second phase duration) based on the peak residual power, and operate the SSD in the second power phase for the preselected second phase time period.

Additional Aspects

At least some of the processing circuits described herein may be generally adapted for processing, including the execution of programming code stored on a storage medium. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

At least some of the processing circuits described herein may be arranged to obtain, process and/or send data, control data access and storage, issue commands, and control other desired operations. The processing circuits may include circuitry configured to implement desired programming provided by appropriate media in at least one example. For example, the processing circuits may be implemented as one or more processors, one or more controllers, and/or other structure configured to execute executable programming. Examples of processing circuits may include a general purpose processor, a digital signal processor (DSP), an ASIC, a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. At least some of the processing circuits may also be implemented as a combination of computing components, such as a combination of a controller and a microprocessor, a number of microprocessors, one or more microprocessors in conjunction with an ASIC and a microprocessor, or any other number of varying configurations. The various examples of processing circuits noted herein are for illustration and other suitable configurations within the scope of the disclosure are also contemplated.

Aspects of the subject matter described herein can be implemented in any suitable NVM, including NAND flash memory such as 3D NAND flash memory. More generally, semiconductor memory devices include working memory devices, such as DRAM or SRAM devices, NVM devices, ReRAM, EEPROM, flash memory (which can also be considered a subset of EEPROM), ferroelectric random access memory (FRAM), and MRAM, and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured. The semiconductor memory elements located within and/or over a substrate may be arranged in two or three dimensions, such as a two dimensional memory structure or a three-dimensional memory structure.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements. One of skill in the art will recognize that the subject matter described herein is not limited to the two-dimensional and three-dimensional exemplary structures described but cover all relevant memory structures within the spirit and scope of the subject matter as described herein and as understood by one of skill in the art.

The examples set forth herein are provided to illustrate certain concepts of the disclosure. The apparatus, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented, or a method may be practiced using any number of the aspects set forth herein. In addition, such an apparatus may be implemented, or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatus, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state, or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," "in one aspect," or similar language means that a particular feature, structure, or characteristic described in connection with the embodiment is included in at least one embodiment of the present disclosure. Thus, appearances of the phrases "in one embodiment," "in an embodiment," "in one aspect," and similar language throughout this specification may, but do not necessarily, all refer to the same embodiment, but mean "one or more but not all embodiments" unless expressly specified otherwise.

The terminology used herein is for the purpose of describing particular aspects only and is not intended to be limiting of the aspects. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," and variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of A, B, or C" or "A, B, C, or any combination thereof" or "one or more of A, B, or C" used in the description or the claims means "A or B or C or any combination of these elements." For example, this terminology may include A, or B, or C, or A and B, or A and C, or A and B and C, or 2A, or 2B, or 2C, or 2A and B, and so on. As a further example, "at least one of: A, B, or C" or "one or more of A, B, or C" is intended to cover A, B, C, A-B, A-C, B-C, and A-B-C, as well as multiples of the same members (e.g., any lists that include AA, BB, or CC). Likewise, "at least one of: A, B, and C" or "one or more of A, B, or C" is intended to cover A, B, C, A-B, A-C, B-C, and A-B-C, as well as multiples of the same members. Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A data storage device (DSD), the DSD comprising:
a non-volatile memory (NVM); and
one or more processors coupled to the NVM, the one or more processors, individually or in combination, configured to:
  set a first peak power for a first power phase to a fixed value;
  operate the DSD at a first DSD power consumption that is less than the first peak power for the first power phase;
  determine a second peak power for a second power phase based on a first residual power equal to a difference between a preselected average power threshold and the first DSD power consumption;
  determine a second phase time period based on the first residual power;
  operate the DSD in the second power phase at a second DSD power consumption that is less than the second peak power for the second phase time period;
  determine a second residual power based on the first residual power plus a difference between the average power threshold and the second DSD power consumption;
  set a third peak power equal to the first peak power;
  operate the DSD at a third DSD power consumption for a third power phase, wherein the third DSD power consumption is less than the third peak power;
  determine a third residual power based on the second residual power plus a difference between the average power threshold and the third DSD power consumption;
  determine a fourth peak power based on the third residual power;

determine a fourth phase time period based on the third residual power; and operate the DSD at a fourth DSD power consumption that is less than the fourth peak power for the fourth power phase.

2. The data storage device of claim 1:
wherein the one or more processors, individually or in combination, is further configured to determine a power cost for entry into, and exit from, the second power phase; and
wherein the second DSD power consumption is based on the residual power and the power cost.

3. The data storage device of claim 2, wherein the one or more processors, individually or in combination, is further configured to determine the second phase time period further based on the power cost.

4. The data storage device of claim 1, wherein the residual power is a negative value.

5. The data storage device of claim 1, wherein the one or more processors, individually or in combination, is further configured to:
receive commands from a host device; and
execute the commands using the NVM.

6. The data storage device of claim 1, wherein the one or more processors, individually or in combination, is further configured to alternate peak power values over a plurality of subsequent power phases between the fixed value and adjustable values determined, at least in part, based on a most recent residual power value.

7. A method for use with a data storage device (DSD) including a non-volatile memory (NVM), the method comprising:
setting a first peak power for a first power phase to a fixed value;
operating the DSD at a first DSD power consumption that is less than the first peak power for the first power phase;
determining a second peak power for a second power phase based on a first residual power equal to a difference between a preselected average power threshold and the first DSD power consumption;
determining a second phase time period based on the first residual power;
operating the DSD in the second power phase at a second DSD power consumption that is less than the second peak power for the second phase time period;
determining a second residual power based on the first residual power plus a difference between the average power threshold and the second DSD power consumption;
setting a third peak power equal to the first peak power;
operating the DSD at a third DSD power consumption for a third power phase, wherein the third DSD power consumption is less than the third peak power;
determining a third residual power based on the second residual power plus a difference between the average power threshold and the third DSD power consumption;
determining a fourth peak power based on the third residual power;
determining a fourth phase time period based on the third residual power; and
operating the DSD at a fourth DSD power consumption that is less than the fourth peak power for the fourth power phase.

8. The method of claim 7, further comprising:
determining a power cost for entry into, and exit from, the second power phase; and
wherein the second DSD power consumption is based on the residual power and the power cost.

9. The method of claim 8, further comprising:
determining the second phase time period further based on the power cost.

10. The method of claim 7, further comprising alternating peak power values over a plurality of subsequent power phases between the fixed value and adjustable values determined, at least in part, based on a most recent residual power value.

11. A data storage device (DSD), the DSD comprising:
a non-volatile memory (NVM); and
one or more processors coupled to the NVM, the one or more processors, individually or in combination, configured to:
provide a sequence of alternating first and second power phases;
operate the DSD during the first power phases at a DSD power consumption that is less than a preselected fixed peak power, wherein the first power phases each have a preselected fixed duration; and
operate the DSD during the second power phases at a DSD power consumption that is less than a variable peak power determined based on (a) a preselected average power threshold, (b) an actual power consumption of the previous first power phase, and (c) a residual power that is accumulated over one or more previous first and second power phases, and wherein the second power phases have variable durations determined based on the residual power.

12. The data storage device of claim 11, wherein the first power phases are even-numbered power phases and the second power phases are odd-numbered power phases.

13. The data storage device of claim 11:
wherein the one or more processors, individually or in combination, is further configured to determine a power cost for entry into, and exit from, the second power phases; and
wherein the DSD power consumption for the second power phases is further based on the residual power and the power cost.

14. The data storage device of claim 13, wherein the one or more processors, individually or in combination, is further configured to determine the variable durations of the second phase based on the power cost and the residual power.

15. The data storage device of claim 11, wherein the residual power is a negative value.

16. The data storage device of claim 11, wherein the one or more processors, individually or in combination, is further configured to:
receive commands from a host device; and
execute the commands using the NVM.

17. A method for use with a data storage device (DSD) including a non-volatile memory (NVM), the method comprising
providing a sequence of alternating first and second power phases;
operating the DSD during the first power phases at a DSD power consumption that is less than a preselected fixed peak power, wherein the first power phases each have a preselected fixed duration; and
operating the DSD during the second power phases at a DSD power consumption that is less than a variable peak power determined based on (a) a preselected average power threshold, (b) an actual power consumption of the previous first power phase, and (c) a residual power that is accumulated over one or more previous first and second power phases, and wherein the second power phases have variable durations determined based on the residual power.

18. The method of claim 17, wherein the first power phases are even-numbered power phases and the second power phases are odd-numbered power phases.

19. The method of claim 17, further comprising:
determining a power cost for entry into, and exit from, the second power phases; and
wherein the DSD power consumption for the second power phases is further determined based on the residual power and the power cost.

20. The method of claim 19, further comprising determining the variable durations of the second phase based on the power cost and the residual power.

21. An apparatus for use with a data storage device (DSD) including a non-volatile memory (NVM), the apparatus comprising
means for providing a sequence of alternating first and second power phases;
means for operating the DSD during the first power phases at a DSD power consumption that is less than a preselected fixed peak power, wherein the first power phases each have a preselected fixed duration; and
means for operating the DSD during the second power phases at a DSD power consumption that is less than a variable peak power determined based on (a) a preselected average power threshold, (b) an actual power consumption of the previous first power phase, and (c) a residual power that is accumulated over one or more previous first and second power phases, and wherein the second power phases have variable durations determined based on the residual power.

* * * * *